United States Patent [19]

Newell, III

[11] 4,082,064

[45] Apr. 4, 1978

[54] ANIMAL FEEDING APPARATUS

[76] Inventor: Alfred Turenne Newell, III, 324 Redwood St., Birmingham, Ala. 35210

[21] Appl. No.: 635,644

[22] Filed: Nov. 26, 1975

[51] Int. Cl.² .................. A01K 5/02; A01K 39/00
[52] U.S. Cl. ........................... 119/51.11; 119/52 AF
[58] Field of Search .................. 119/51 R, 52 AF, 53, 119/51.11, 18

[56] References Cited

U.S. PATENT DOCUMENTS

| | | | |
|---|---|---|---|
| 2,257,734 | 10/1941 | Cornell | 119/21 |
| 3,122,130 | 2/1964 | Brown et al. | 119/51.11 X |
| 3,124,104 | 3/1964 | Carpenter | 119/52 AF X |
| 3,168,888 | 2/1965 | Brodrick | 119/51 R |
| 3,230,933 | 1/1966 | Myers et al. | 119/53 |
| 3,785,345 | 1/1974 | Rhinehart et al. | 119/18 |

*Primary Examiner*—Hugh R. Chamblee
*Attorney, Agent, or Firm*—David H. Hill

[57] ABSTRACT

An animal feeding apparatus is disclosed that is particularly well-suited for intermittent feeding of poultry. The apparatus includes a plurality of feeding pans arranged in groups, with each group connected through a feeder conduit to feed storage hoppers. The feed storage hoppers are connected to a storage bin through a supply conduit, with each connection to a feed storage hopper being through an adjustable passageway having an excess feed reservoir connected therewith. The feeder structure, consisting of the feeding pans, feeder conduits and feed storage hoppers, is normally within a poultry house and is moved upwardly and downwardly by a reversible motor and cable drive unit to effect intermittent feeding of poultry within the poultry house. An electrical control system is both manually and automatically operable, and in the automatic mode includes a timer to periodically control lowering of the feeding structure to a feeding position for a period of time during which the poultry may eat the feed in the feeding pans, and after which the feeder structure is caused to be raised for a period of time to a non-feeding position where the poultry cannot reach the feed in the feeding pans. The electrical control system includes upper and lower limit switches to establish the feeding and non-feeding positions assumed by the feeder structure, and both switches are adjustable height-wise to allow for growth of poultry and for raising the feeder structure a sufficient distance for cleaning of the poultry house and the like. A plurality of pressure switches are also utilized to control conveying by an auger or the like of the proper amount of feed through the supply and feeder conduits. In addition, light-dimming circuitry is provided for reducing the intensity of the light within the poultry house at the end of each feeding period, and heaters within the poultry house can also be controlled by the electrical control system.

17 Claims, 7 Drawing Figures

ANIMAL FEEDING APPARATUS

FIELD OF THE INVENTION

This invention relates to animal feeding apparatus, and more particularly relates to an apparatus for intermittent feeding of poultry.

BACKGROUND OF THE INVENTION

The feeding of animals has necessarily become more automated during the past few years due, at least in part, to increased labor and feed costs, necessitating, among other things, handling of a greater number of animals with greater feeding efficiency.

Where the animals are grown for meat consumption, it is desirable, of course, to approach the maximum possible yield of salable meat in relation to the amount of feed consumed by the animals. Over the years nutritionists have been able to blend better feed rations by addition of vitamins, nutrients, minerals and other feedstuff ingredients which have resulted in substantial savings through faster growth of the animal and a better ratio of salable meat produced per pound of feed consumed by the animals. In growing poultry, it has been found that poultry feeds should commonly include a number of ingredients, and the percentages of each such ingredient can be varied somewhat to allow the nutritionist a certain amount of latitude as to the amount of each ingredient to be utilized in the feed. Thus, as the price of feed ingredients increases or decreases in the market place, the percentages, within tolerances, can be altered, perhaps by the aid of a computer, in an attempt to maintain the amount and price of consumed feed at a minimum.

The advantages to be gained through better feeds at minimum cost can be lost, however, if the feed is not utilized in an effective manner. In this connection, the more concentrated feeds frequently pass quickly through the digestive tract of the fowl, or animals, with only a portion of their nutritive value being utilized. It has been discovered that after feeding these concentrated feeds for several hours, if they are withdrawn for a period of time, such as an hour, the poultry better digest more of the nutritive ingredients from the feeds, resulting in feed savings.

It has been the general practice in recent years to store large quantities of feed in bins or silos outside the poultry, or animal, enclosures. From these large storing bins, conveying systems, or augers, are commonly utilized to deliver the feedstuff into the building housing the poultry, where the feed is placed in hoppers for distribution by automatic feeding systems to pans or troughs from which the animals eat directly.

While systems have been suggested and/or utilized for restricting feeding of animals, no economically feasible system for restricting feeding for poultry and other animals has been heretofore found that adapts readily to existing automatic hopper filling systems and existing feeding systems while keeping the individual design and advantages of these systems intact, such as, for example, delivering equal quantities and qualities of feedstuffs or rations to all parts of a poultry or livestock building simultaneously, keeping birds or animals from crowding or bruising one another as feeding begins, keeping animals or fowl from being hurt or injured by moving parts of the feeding system, and providing easily adjustable feeder arrangements at a height at which animals or fowl may eat with a minimum of waste, such as is caused by fowl or animals merely raking feed from the pans or troughs into the floor or ground where the feed is wasted. Much feed is now wasted in at least some prior art systems after poultry have eaten their fill by the poultry tasting the feed for lack of anything more to do and letting it spill out of their mouths onto the floor or ground.

Systems have also heretofore been suggested for use in poultry feeding wherein the feeding pans are suspended in such a manner that the height can be adjusted as the birds grow. In addition, systems have heretofore been suggested for intermittent feeding of poultry by closing the feeding area as by doors, for example, or raising a feeding trough so that the poultry cannot reach the feed.

There are various systems of pans and troughs that have been utilized into which feed is provided for fowl or animals. Automatic filling units and the like have commonly included a large many-ton external storage bin outside the building and a conveyer or auger system to convey feed to feed hoppers within the building, which hoppers may be kept filled by volume pressure switches. Heretofore, however, there has been no economical method for readily adapting such feeder and hopper filling systems to an automatic system whereby feeding time is electrically controlled and regulated to periodically remove the feed, while at the same time not adversely affecting the automatic filling unit.

SUMMARY OF THE INVENTION

This invention provides an improved animal feeding apparatus that is well-suited for use in feeding poultry, with intermittent feeding being automatically achieved without adversely affecting the feed supply unit.

An automated program of feeding time is provided, during which equal rations are provided to all poultry within the enclosure at the same time, a predetermined number of times a day. At the same time, when feeding is stopped, there is an automatic reduction of the light in the building, resulting in less activity by the poultry to better allow the poultry to assimilate more effectively the feed which the poultry have consumed and to reduce pecking between poultry that can reduce the amount of salable product.

To achieve an automatic program system, feeding pans are raised slightly above the possible feeding height of the poultry by a system of electrically driven winches controlled to adjustable heights by limit switches. The limit switches are adjustable to control the distance of travel of the feeding system or unit, and the height to which it may travel upward as it is withdrawn and conversely returned to the normal feeding heigh may therefore be readily adjusted as the poultry grow in size and stature.

A telescoping feed tube is utilized along with a feed reservoir so that the feeding filling unit is not adversely affected by movement of the feeding unit. The consistency of poultry feed is often such that if it is compressed in a tube or conveyer, the particles thereof will bond together, causing a restriction which will stop-up conventional feeding systems.

It is therefore an object of this invention to provide an improved animal feeding apparatus.

It is another object of this invention to provide an improved poultry feeding apparatus.

It is still another object of this invention to provide an improved animal feeding apparatus for intermittent feeding of animals such as poultry.

It is yet another object of this invention to provide an improved animal feeding apparatus that automatically moves the feeding unit into a feeding position for a predetermined period of time and then removes the feeding unit for a second predetermined period of time.

It is yet another object of this invention to provide an improved animal feeding apparatus that includes electrical control means for automatically causing movement of the feeding unit to the feeding and non-feeding positions, while at the same time controlling the flow of feed into the food supply unit.

It is another object of this invention to provide an improved poultry feeding apparatus wherein the feeding unit is moved between feeding and non-feeding positions without adversely affecting the feed-fill unit capacity to function.

It is yet another object of this invention to provide an improved poultry feeding apparatus that includes a feed supply unit havig a conduit with a telescoping section and a reservoir for handling excess feed due to movement of the feeding unit connected with the conduit.

It is still another object of this invention to provide an improved animal feeding apparatus that includes a light control unit for automatically reducing the intensity of light within a poultry house when feed is withdrawn from poultry therein.

With these and other objects in view, which will become apparent to one skilled in the art as the description proceeds, this invention resides in the novel construction, combination, and arrangement of parts substantially as hereinafter described, and more particularly defined by the appended claims, it being understood that changes in the precise embodiment of the hereindisclosed invention are meant to be included as coming within the scope of the appended claims.

BRIEF DESCRIPTION OF THE DRAWINGS

The accompanying drawings illustrate complete embodiments of the invention according to the best mode so far devised for the practical application of the principles thereof, and in which.

DESCRIPTION OF THE INVENTION

Figure 1:
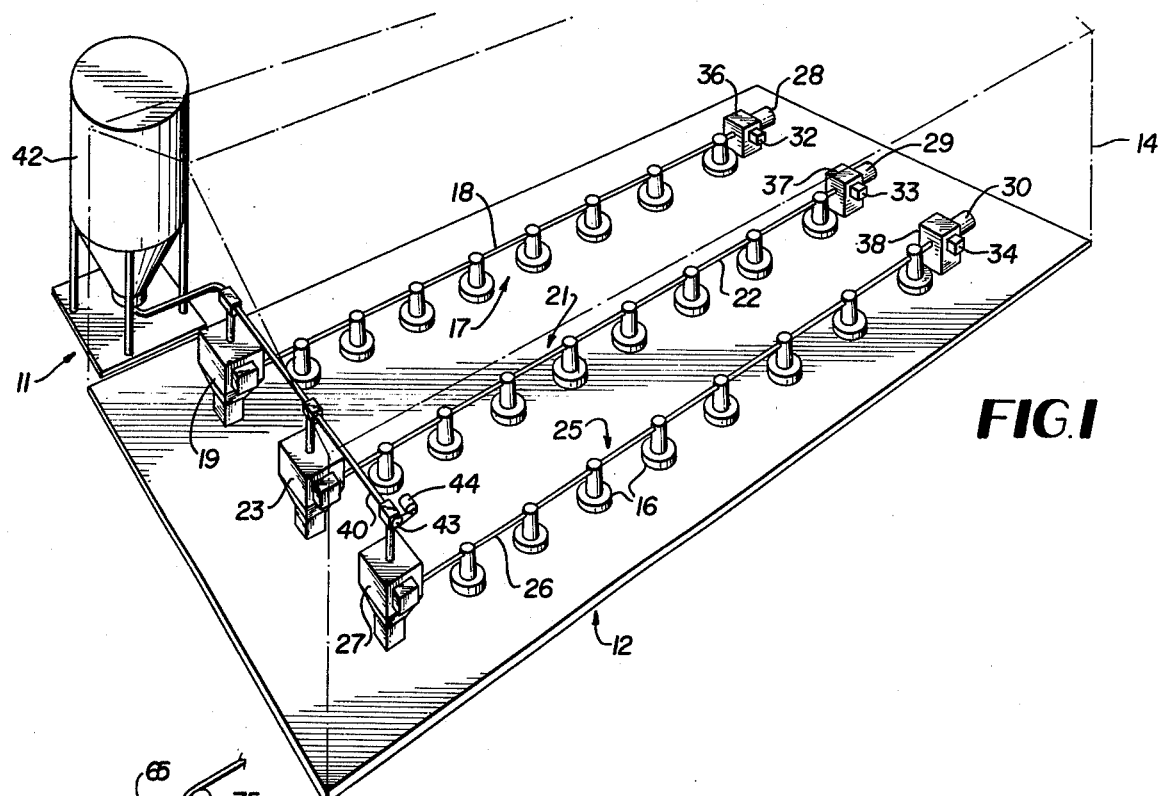
FIG. 1 is a perspective view of the animal feeding apparatus of this invention.

Referring now to the drawings, the numeral 11 refers generally to the animal feeding apparatus of this invention. As shown in FIG. 1, feeding unit 12 is conventionally housed within an enclosure or poultry house 14 (shown in FIG. 1 without fully illustrated conventional walls and a roof, for purposes of illustration).

Feeding unit 12 conventionally includes a plurality of feeding pans 16 (troughs could be utilized, if desired) a first group 17 of which are connected through a conduit 18 to a feed receptacle or hopper 19. In like manner, a second group of pans 21 may be connected through a conduit 22 to a second feed receptacle or hopper 23. For purposes of illustration, a third group of pans 25 is also shown in FIG. 1 to be connected through conduit 26 to a third receptacle or hopper 27. It is to be realized, of course, that any convenient number of pans, groups of pans, conduits and hoppers may be utilized as desired within the operating capability of the system. However, the remainder of discussion herein will include only two groups of pans, conduits and hoppers as the feeding units, for simplicity and convenience. An example of feeding pans connected with a hopper through a conduit arrangement is shown, for example, in U.S. Pat. No. 3,033,163, while a trough and hopper arrangement is shown in U.S. Pat. No. 3,124,104.

Feed is withdrawn from each hopper and conveyed by conventional means, such as an auger or chain arrangement (not shown) to the associated feeding pans, with an auger being preferred and being driven by motors 28, 29 and 30 for the three groups of pans 17, 21 and 25, respectively. The amount of feed in the feeding pans is controlled by energization of motors associated with each group of pans, and conventional pressure switches 32, 33 and 34 are utilized in conjunction with motors 28, 29 and 30, respectively, to control the maximum height of feed, the pressure switches being commonly positioned in a return or overflow hopper 36, 37 and 38 (for motors 28, 29 and 30, respectively). The pressure switches could, if desired, be placed in one of the associated feeder pans, it being essential only that the switch be actuated by the pressure of an amount of feed equivalent to that desired in each pan (with a delivery system full of feed, an equal amount will be delivered to each pan as the auger is operated by the associated motor).

As shown in FIG. 1, a feed supply conduit 40 connects the hoppers 19, 23 and 27 with a storage bin 42 located outside the poultry house 14. Bin 42 is conventionally a large storage bin holding normally many tons of feed. Feed is conventionally withdrawn from bin 42 by an auger 41 (FIG. 2) within the conduit, with the auger being connected at the free end with a pulley 43 conventionally driven by motor 44. A pressure switch is normally located in one or more of the receptacles or hoppers (pressure switches 46 and 47 being indicated in hoppers 23 and 27 as shown in FIG. 2) to automatically control the maximum height of feed in the hopper.

Figure 2:
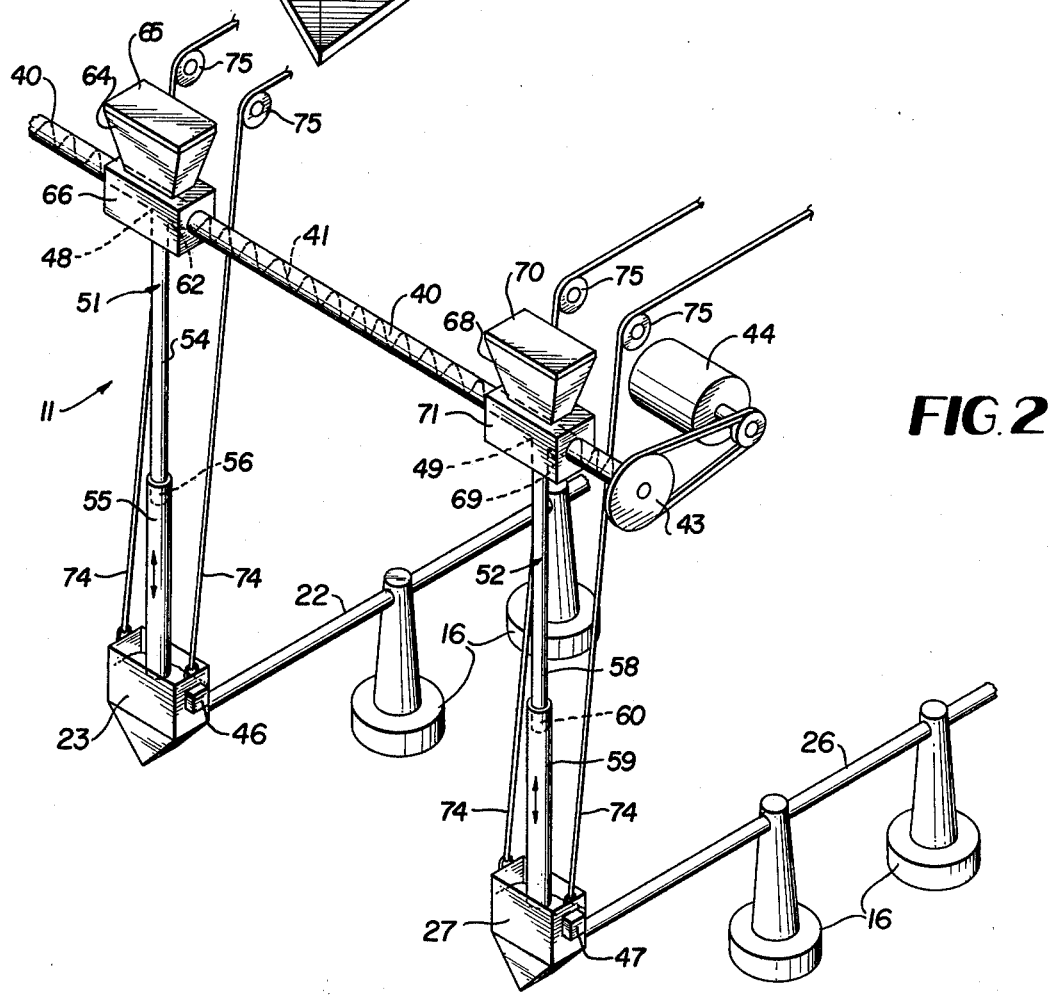
FIG. 2 is a partial perspective view illustrating a portion of the apparatus shown in FIG. 1, and more particularly illustrating the telescoping conduit sections and reservoir in the feed supply unit.

As best shown in FIG. 2, feed supply conduit 40 includes portions 48 and 49 opening into telescoping conduits 51 and 52, respectively, the former to extending hopper 23, and the latter to hopper 27.

Telescoping conduit 51 includes a pair of tubes 54 and 55, with tube 54 being of slightly smaller diameter than tube 55 (at least at the lower end of tube 54 with respect to the upper end of tube 55), and the lower end of tube 54 is received within the upper end of tube 55 to establish a sliding joint 56 therebetween. Thus, relative movement between the hopper 23 and bin 42 and/or conduit 40 will cause relative longitudinal movement between tubes 54 and 55 to permit such movement. Obviously, if hopper 23 is moved upwardly, tube 54 will move further into tube 55 and thus the telescoping unit 51 will present a shorter passage for feed from conduit 40 to hopper 23. In like manner, telescoping unit 52 consists of tubes 58 and 59 forming a sliding joint 60 between conduit 40 and hopper 27.

At the junction 62 between conduit 40 and conduit unit 51 an excess feed reservoir 64 is provided. With tubing 54 of conduit unit 51 opening into the bottom of conduit 40 at portion 48 thereof, the reservoir preferably opens into the top of conduit 40 directly above conduit 54. Reservoir 64 is preferably a closed receptacle, but may have a removable top 65, if desired. The junction 62 of the tube 54, conduit or tube 40 and the reservoir 40 (opening into conduit 46) may be enclosed by housing 66, if desired. In like manner, a reservoir 68 is provided above the junction 69 of tube 58 conduit 40. Also in like manner, a top 70 may be provided for the reservoir 68, and the junction may enclosed by a housing 71.

The telescoping conduit and reservoir for each hopper prevents clogging of the fill means as the feeding pans are hoisted above the normal reach or feeding levels of poultry. It is possible, for example, that the fill system be completely full of feed at a given time, including the gravity fill drop tubes to each pan in the feeder conduit assemblies. If at this time feed is to be removed from the poultry, a compacting of the feed in the tube would be possible, and most probable. The reservoir above each junction in the main conduit 40 allows the feed in the telescoping tubing to be displaced upwardly to thus prevent the packing or compression of feed in the tubes as the tubes are telescoped due to upward movement of the associated hopper. The expansion or excess feed reservoir is positioned so that when the hopper is lowered or requires more feed to fill the hopper, the reservoir will empty itself automatically by gravity. A coreless type auger 41 is preferably used in conveying poultry feeds, and only slight pressure will cause the feed to pass from the tubing through and around the auger to the reservoir, which will empty in the same manner, by gravity, as the feeding system is lowered.

Figure 3:
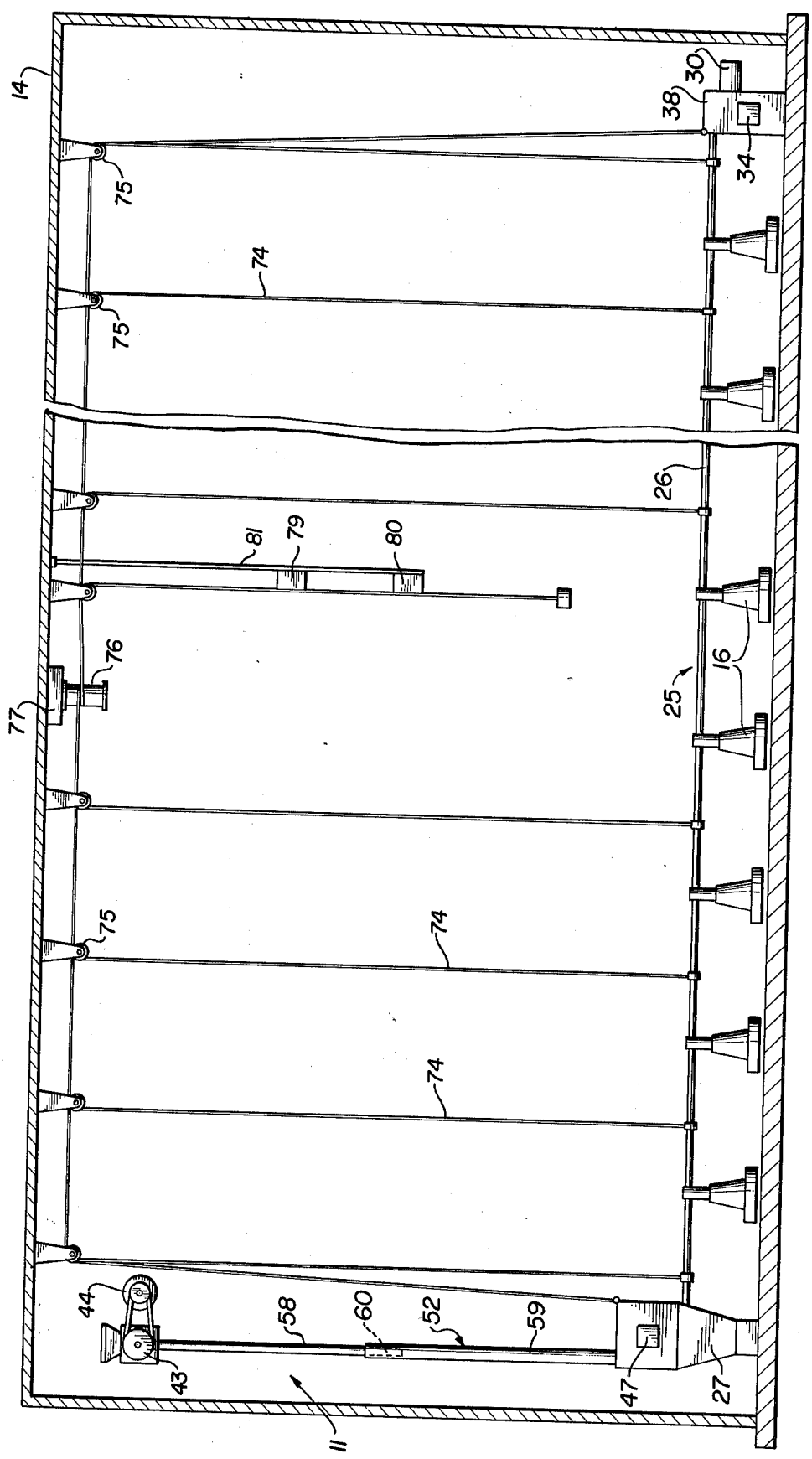
FIG. 3 is a side view schematic diagram illustrating hoisting of the feeder units by means of cables and winches.

As also indicated in FIG. 2, and as shown best in FIG. 3, the feeding unit consisting of the group of pans, conduit and associated hopper is moved upwardly and downwardly to achieve intermittent feeding by means of cables 74 conventionally attached at spaced points to the reservoir and associated conduit.

The cables extend over pulleys 75 to an actuating unit such as a power winch 76 driven by a conventional reversible electric motor 77. An example of a hoisting arrangement utilizing cables is shown, by way of example, in U.S. Pat. No. 3,124,104.

Motor 77, when energized, drives winch 76 to either raise or lower the feeding unit, depending upon the drive provided by the reversible motor. As indicated in the electrical control circuit drawings, a motor is preferably provided for each feeder unit to be moved. Preferably, however, only one unit has upper and lower limit switches 79 and 80, respectively, associated therewith to establish the height for all of the units at the feeding and non-feeding positions, particularly for use during the automatic mode, and the other motors for the associated feeder units are preferably energized and deenergized in connection with the motor having the upper and lower limit switches associated therewith. Such an arrangement of course is not mandatory, and each unit could be individually controlled throughout if desired, but this has not been found to be preferable. As shown in the drawings, motor 77 is associated with the feeder unit including the group of pans 25, conduit 26 and hopper 27, while a second motor 82 (FIG. 5) is provided for the feeder unit including the group of pans 21, conduit 22 and hopper 23. In like manner, other motors could be provided for any added feeder units.

Limit switches 79 and 80 are positioned in any convenient manner such as, for example, on a cable 81 extending downwardly so that the limit switches are actuated by upward and downward movement of the feeder unit. While not shown, the limit switches obviously could also be positioned on the telescoping conduits 58 and 59, for example, or mounted to monitor vertical movement of the hopper itself.

Figure 4:
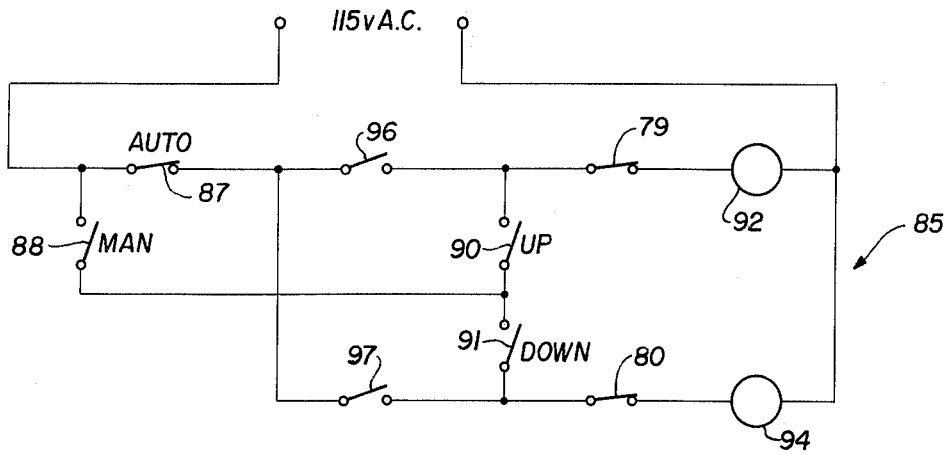
FIG. 4 is a basic electrical circuit diagram of the electrical control circuitry included in this invention.
Figure 5:
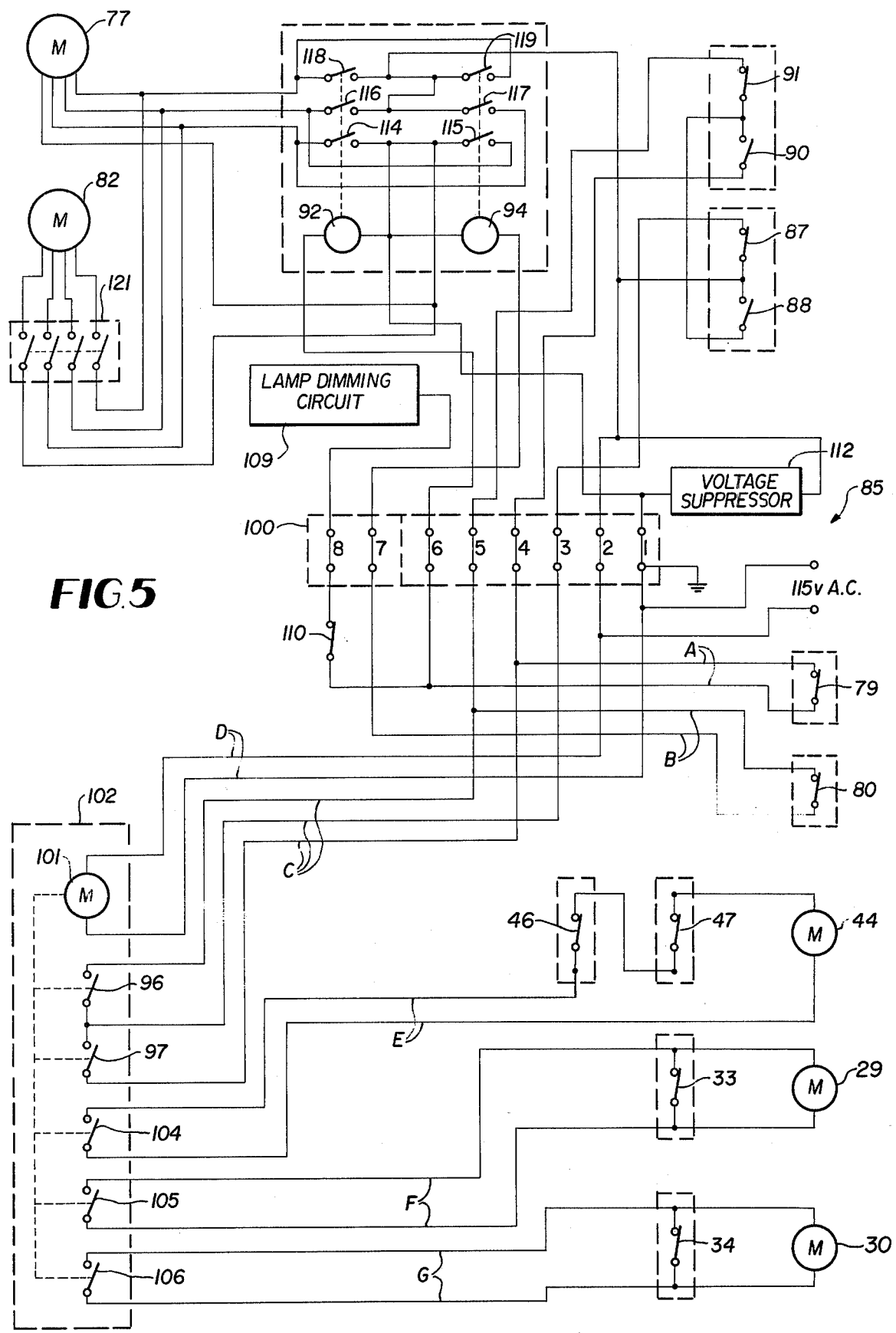
FIG. 5 is a detailed electrical circuit diagram of the electrical control unit preferably utilized in this invention.

Referring now to the electrical control circuitry 85 included in this invention, a basic electrical diagram is shown in FIG. 4, with the preferred detailed electrical diagram being set forth in FIG. 5. As shown, the system can be operated in either a manual or automatic mode. As shown in FIGS. 4 and 5, the automatic mode is selected by closing automatic mode switch 87, and the manual mode is selected by closing manual mode selection switch 88.

Manual mode selection switch 88 has one side connected between normally open UP and DOWN manual switches 90 and 91, respectively, with the other side of the manual switch being connected to one side of the power supply. For manual operation (with manual selection switch 88 closed) closing of manual UP switch 90 will energize UP relay 92 (so long as upper limit switch 79 is closed to indicate that the feeder unit is not yet at the maximum height which has been set by positioning of the limit switch); the other side of relay 92 is connected to the other side of the power supply, and this energizes motor 77 to raise the feeder circuit. In like manner, closing of manual DOWN switch 91 will energize DOWN relay 94 (as long as DOWN limit switch 80 is closed) to cause the feeder unit to be lowered.

As shown in FIG. 4, the automatic mode causes automatic raising and lowering of the feeder unit (so long as the upper and lower limit switches are closed) by means of switches or contacts 96 and 97 in a timer.

FIG. 5 shows in detail the electrical control circuitry. Switches 87 and 88 determine the automatic or manual mode to be selected, and switches 90 and 91 provide for manual operation of the unit as detailed hereinabove with respect to FIG. 4.

Figure 6:
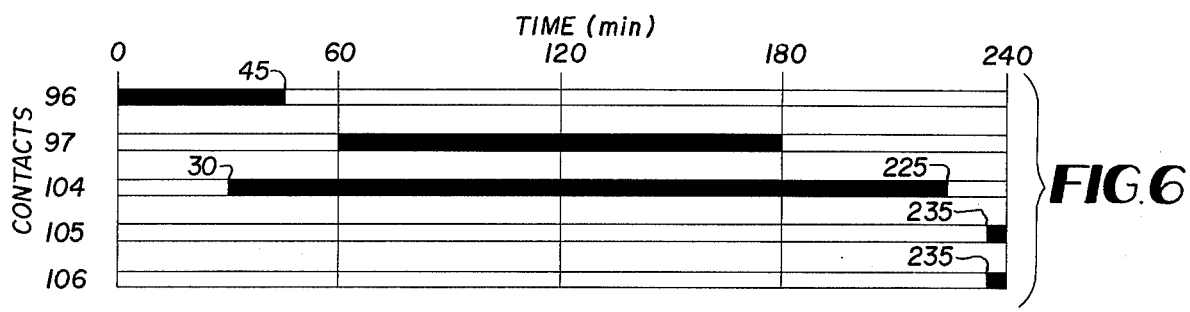
FIG. 6 is a typical timing sequence layout for the timer illustrated in FIG. 5.

As shown in FIG. 5, the power supply (indicated as 115 volt AC with ground) is coupled on separate leads to terminals 1 and 2 to ground in terminal block 100. As shown, the power supply is likewise coupled on separate leads to motor 101 in timer clock 102 (through leads indicated as D). Timer 102 is preferably a 24-hour clock and closes a plurality of switches or contacts at predetermined times for predetermined periods of time, as is conventional. As indicated in FIG. 5, contacts or switches 96, 97, 104, 105 and 106 are controlled by motor 101. The number of contacts can, of course, be altered as is deemed desirable. FIG. 6 shows a typical arrangement for closing each contact, the darkened portion indicating a closed contact and the blank portion an open contact.

As shown in FIG. 5, contacts 96 and 97 are connected through separate leads (indicated as C) to terminals 3, 4 and 5 on terminal block 100; contact 104 is connected through separate leads (indicated as E) to the pressure switches 46 and 47 in the hoppers 23 and 27, respectively; contact 105 is connected through separate leads (indicated as F) to pressure switch 33 associated with the feeder unit driven by motor 29; and contact 106 is connected through separate leads (indicated as G) to pressure switch 34 associated with the feeding unit driven by motor 30.

Referring now to the terminal block 100, terminals 4 and 6 are connected on separate leads (indicated as A) to the upper limit switch 79, while 5 and 7 are connected on separate leads (indicated as B) to lower limit switch 80.

In addition, as indicated in FIG. 5, terminal 6 can be connected with conventional lamp-dimming circuitry 109 to dim the lights automatically when the feed unit is raised from the feeding position. A switch 110 can also be provided to manually disengage the lamp-dimming circuitry as desired.

The terminal block 100 has a voltage suppression unit 112 connected across pins 1 and 2, with pin 1 also being connected to one side of UP and DOWN relays 92 and 94 and to one side of normally open relay switches 114 and 115. Pin 2 is connected to the junction of automatic and manual mode selection switches 87 and 88, and is also connected to one side of normally open relay switches 116, 117, 118 and 119. As shown, switches 114, 116 and 118 are controlled by UP relay 92, while switches 115, 117 and 119 are controlled by DOWN relay 94.

With respect to the remaining terminals or contacts on terminal block 100, pin 3 of terminal block 100 is connected to automatic mode selection switch 87, pin 4 is connected to manual UP switch 90, pin 5 is connected to the manual DOWN switch 91 (the junction of switches 90 and 91 is connected with manual mode selection switch 88), pin 6 is connected with UP relay 92, and pin 7 is connected with DOWN relay 94.

Relay actuated switches 114–119 are connected with the hoist motors to provide power and make the motors reversible. As shown, switches 114–119 are connected to motors 77 and 82, but could also be connected with other motors that may be utilized to raise and lower other feeding units in the same manner as do motors 77 and 82. Motor 77 is connected with limit switches, while motor 82 is preferably energized to raise and lower a feeding unit in conjunction with motor 77. As shown, a four-pole safety switch 121 is connected with motor 82 to permit equalizing the location of the feeding units utilized.

Figure 7:
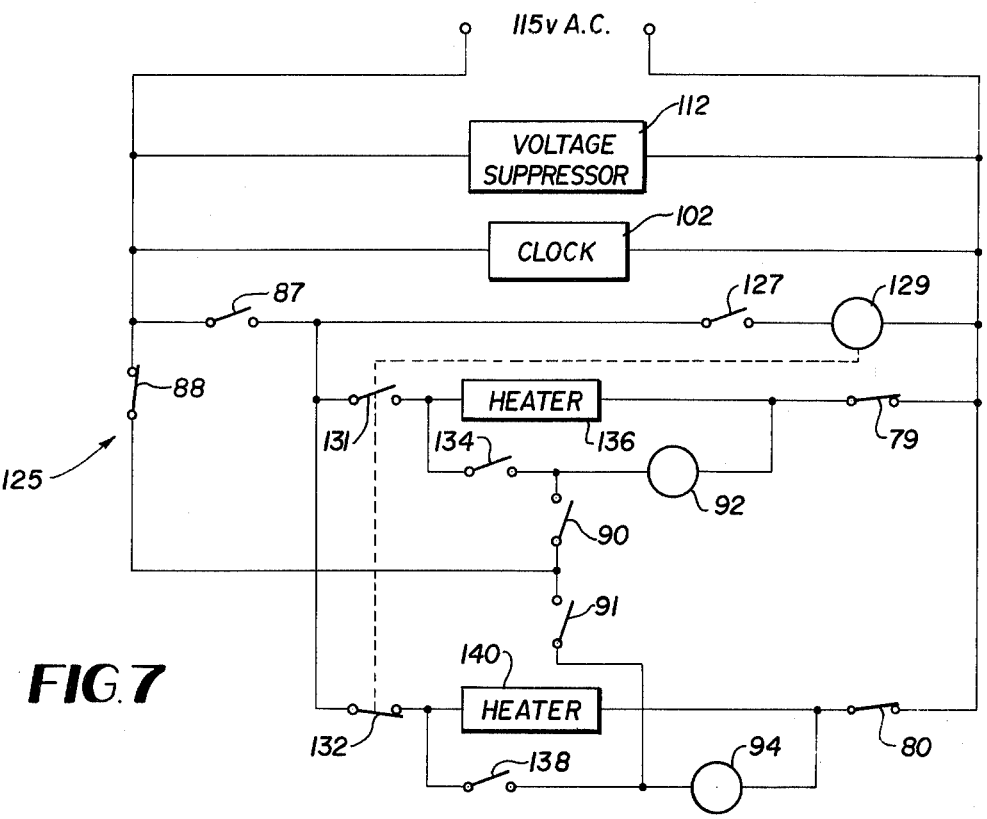
FIG. 7 is an alternate embodiment of the basic electrical circuitry that can be utilized as the electrical control circuit for this invention, showing use with a heater.

FIG. 7 shows a modified embodiment of the electrical control system 125 that can be utilized, if desired. As shown, a voltage suppressor 112 is connected across the power supply leads, as is timer clock 102. In addition manual and automatic mode selection switches 88 and 87, respectively, are utilized, with the manual mode selection switch 88 (shown closed) being connected to a point between manual up and down switches 90 and 91. The automatic mode selection control switch 87 (shown open) is connected to one side of timer control switch 127, the other side of which switch is connected with one side of timing relay 129; the other side of the relay is connected with one side of the power supply. Timing relay 129 controls relay switches 131 and 132 in the automatic mode, and one side of each of switches 131 and 132 is connected to automatic mode selection switch 87.

The other side of switch 131 is connected to one side of timer clock control switch 134 and heater 136, with the other side of switch 134 being connected to one side of UP relay 92 and UP manual switch 90. The other side of heater 136 and UP relay 92 are connected together through upper limit switch 79 to the power supply lead.

In like manner, the other side of switch 132 is connected to one side of timer clock control switch 138 and heater 140, with the other side of switch 138 being connected to one side of DOWN relay 94 and DOWN manual switch 91. The other side of heater 140 and DOWN relay 94 are connected together through DOWN limit switch 80 to the power supply lead.

In operation, if the manual mode selection switch 88 is closed, closing of the manual UP switch 90 will energize motors 77 and 82 and cause the feeder units to be moved upwardly. If switch 90 is maintained closed, then the feeder units will continue to move upwardly until the upper limit switch 79 is opened, indicating the maximum selected upward movement. For cleaning or the like, the upper limit switch is preferably moved upwardly to a point near the ceiling so that the feeder units may be moved to a point near the ceiling and therefore out of the way. In like manner, closing of the DOWN manual switch 91 will energize the motors 77 and 82 to cause the feeder units to be moved downwardly, and such movement will continue until switch 91 is opened or the lower limit switch 80 opens.

For automatic operation, automatic mode selection control switch 87 is closed and manual mode selection switch 88 is open. The upper and lower limit switches are positioned at the desired feeding and non-feeding positions, so that when the lower limit switch is opened the feeder unit is at the proper height above the floor of the poultry house to enable the poultry to eat. The lower limit switch is therefore adjustable as needed to vary the feeding position during the growth cycle of the poultry. The upper limit switch is positioned so that when open the feeder units are out of reach of the poultry and therefore establishes a non-feeding position. This position can also be adjusted as desired to assure that the poultry cannot reach the feeder pans when the feeder units are in the up or non-feeding position.

Timer 102 is programmed so that the contacts, or switches, are closed at predetermined times and for predetermined time periods, such, for example, as indicated in FIG. 6. As shown therein, contact 96 may be closed at zero time, and this results in raising the feeder units to a non-feeding position where the upper limit switch 79 opens to deenergize the motors 77 and 82. Contacts 96 are opened after 45 minutes and contacts 97 are then closed at the end of one hour, and this results in lowering the feeder units to the feeding position until the lower limit switch 80 opens to deenergize motors 77 and 82 to establish the lowered or feeding position.

As also shown in FIG. 6, the contacts 104 may be closed at the end of 30 minutes, and this causes motor 44 to be energized to deliver feed to hoppers 19, 23 and 27 (as shown), with a pressure switch associated therewith opening to deenergize the motor 44 to indicate that the hoppers are filled. At the end of 180 minutes, contacts 97 are opened, and at the end of 225 minutes contacts 104 are opened. At the end of 235 minutes, contacts 105 and 106 are closed for 5 minutes, and this energizes motors 28 and 29 (as shown) to deliver feed from the hoppers to the feed pans of each group as is necessary to fill the same. The cycle is then completed at 240 minutes, at which time contacts 96 are again closed to raise the feeder units to the non-feeding position. At the time the feeder units are raised, the lights are dimmed in the poultry house and remain dimmed until the feeder units are again lowered to the feeding position.

As can be seen from the foregoing, this invention provides an improved animal feeding system that is particularly well-suited for automatic intermittent feeding of poultry. Hence, the invention is not to be considered as being limited to the particular details given, nor to the specific application to which reference has been made during the description of the apparatus, except insofar as may be required by the scope of the appended claims.

What is claimed is:

1. An animal feeding apparatus, comprising:

stationary feed conveying means;

movable feeder assembly means positioned generally below said stationary feed conveying means and including one or more feeding pans each of which has an open portion through which animals can withdraw feed when said feeder assembly means is at a predetermined feeding position, receptacle means for receiving and holding feed, and conveying conduit means connected between said receptacle means and said feeding pans for supplying feed from said receptacle to said feeding pans;

actuating means connected with said feeder assembly means to move said feeder assembly means relative to said stationary feed conveying means between said predetermined feeding position and a non-feeding position at which said animals cannot withdraw feed from said feeder assembly means;

control means for controlling said actuating means to automatically cause movement of said feeder assembly means to said feeding position for a first predetermined period of time and then cause movement of said feeder assembly means to said non-feeding position for a second predetermined period of time;

movable conduit means of variable length connected between said stationary feed conveying means and said receptacle means to provide a feed passageway therebetween; and auxiliary feed reservoir means distinct from such feedconveying passageway but connected to said stationary feed conveying means in alignment with said movable conduit means for receiving feed displaced in such passageway upon movement of said feeder assembly means between said feeding and non-feeding positions without significant compression of the feed within said conduit means, whereby a bonding together of the individual particles of the feed within said conduit means and a consequent clogging of the feed path there-through are precluded.

2. The animal feeding apparatus of claim 1, wherein said actuating means includes a reversible motor and a cable drive unit connected with said feeder assembly means to move the same, and wherein said control means includes an electrical timing circuitry for controlling energization of said motor to automatically move said feeder assembly means between said feeding and non-feeding positions.

3. The animal feeding apparatus of claim 1, wherein said variable length conduit means includes first and second tubes, with one of said tubes being of slightly smaller diameter than the other of said tubes and having one end thereof received in close-fitting relationship within one end of said other tube, so that said tubes are longitudinally movable with respect to one another to permit said movement of said feeder assembly means between said feeding and non-feeding positions.

4. The animal feeding apparatus of claim 3, wherein said auxilary feed reservoir means is connected to said stationary feed conveying means at the junction of said stationary feed conveying means and the other end of said first tube, whereby excess feed in said first and second tubes due to relative longitudinal movement therebetween is received in said auxiliary feed reservoir.

5. The animal feeding apparatus of claim 4, wherein said apparatus includes a plurality of said movable feeder assembly means connected to said stationary feed conveying means through a corresponding plurality of respective pairs of said first and second tubes, a respective auxiliary feed reservoir means being connected to said stationary feed conveying means at each junction of a respective one of said first tubes therewith.

6. The animal feeding apparatus of claim 1, wherein said apparatus includes environment control means responsive to said movement of said feeder means to establish predetermined environmental changes.

7. The animal feeding apparatus of claim 6, wherein said environmental control means includes light control means, whereby the amount of light at said feeding position is reduced in response to movement of said feeder unit from said feeding position.

8. An animal feeding apparatus, comprising:

movable feeder means having an open portion through which animals can withdraw feed from said feeder means when said feeder means is at a predetermined feeding position;

feed storage means in which feed is stored for delivery to said feeder means;

conduit means connected between said feed storage means and said feeder means to provide a passageway therebetween for conveying feed from said feed storage means to said feeder means;

actuating means connected with said feeder means to move said feeder means relative to said feed storage means between said predetermined feeding position and non-feeding position at which said animals cannot withdraw feed from said feeder means;

light determining means for determining the intensity of light at said feeding position; and control means for controlling said actuating means and said light determining means for automatically causing movement of said feeder means between said feeding and non-feeding positions for predetermined periods of time and causing predetermined changes in light intensity at the feeding position in response to movement of said feeder means to and from said feeding position.

9. The animal feeding apparatus of claim 8, wherein at least said movable feeder means is within an enclosure, and wherein said light determining means causes the intensity of light within said enclosure to be reduced responsive to movement of said feeder means from said feeding position.

10. A poultry feeding apparatus, comprising: a plurality of feeding means each of which has an open portion through which poultry within a poultry house can withdraw feed from said feeding means when said feeding means is at a predetermined feeding position adjacent to the floor of said poultry house;

a feed receptacle within said poultry house;

first conduit means connected between said feed receptacle and each of said plurality of feeding means and through which feed is conveyed from said feed receptacle to said feeding means;

actuating means connected with said plurality of feeding means, feed receptacle and first conduit means to move the same as a unit in opposite substantially veritcal directions between said feeding position adjacent to said floor of said poultry house and an elevated non-feeding position where poultry cannot withdraw feed from the feeding means;

electrical control means for automatically controlling said actuating means to effect a predetermined feeding cycle for said poultry by causing predetermined movement of the said feeding means between said feeding and non-feeding positions;

stationary feed storage means;

a second stationary conduit extending from said feed storage means to deliver feed therefrom;

means for conveying feed through said second conduit;

telescoping means including third and fourth conduits one of which has one end portion of slightly smaller diameter than one end portion of the other so as to be received therein so that said conduits are in telescoping relationship, the other end of said third conduit opening into said feed receptacle and the other end of said fourth conduit opening into a portion of said extending second conduit, whereby feed from said feed storage means is directed into said feed receptacle; and auxiliary feed reservoir means distinct from such feed-conveying passageway but positioned at the junction of said second and and fourth conduits whereby excess feed in said conduits due to telescoping of said third and fourth conduits is received in said reservoir.

11. The poultry feeding apparatus of claim 10, wherein said apparatus includes second actuating means for causing movement of feed through said second conduit, said second actuating means being controlled by said electrical control means in conjunction with movement of said feeding means between said feeding and non-feeding positions.

12. The poultry feeding apparatus of claim 11, wherein said electrical control means includes pressure switches for determining the maximum amount of feed at said feed receptacle.

13. The poultry feeding apparatus of claim 10, wherein said electrical control means includes limit switch means whereby said feeding and non-feeding positions are preset with respect to the height above the floor of said poultry house.

14. The poultry feeding apparatus of claim 13, wherein said limit switches are adjustable to permit adjustment of the feeding and non-feeding positions as desired.

15. The poultry feeding apparatus of claim 10, wherein the said electrical control means includes means for manual control of said actuating means upon deactivation of said automatic control means.

16. The poultry feeding apparatus of claim 10, wherein said appparatus includes light control means to diminish the amount of light within said poultry house when said feeding means is moved from the feeding position.

17. The poultry feeding apparatus of claim 10, wherein said apparatus includes heater means controlled by said electrical control means.

* * * * *